United States Patent
Hayashi et al.

(10) Patent No.: US 11,912,826 B2
(45) Date of Patent: Feb. 27, 2024

(54) FIBER-REINFORCED THERMOPLASTIC RESIN PREPREG AND SHAPED ARTICLE

(71) Applicant: Mitsubishi Chemical Corporation, Tokyo (JP)

(72) Inventors: Takahiro Hayashi, Tokyo (JP);
Takeshi Ishikawa, Tokyo (JP);
Kouichiro Taniguchi, Tokyo (JP);
Kazuya Tanaka, Tokyo (JP);
Masayasu Hasuike, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 832 days.

(21) Appl. No.: 16/994,984

(22) Filed: Aug. 17, 2020

(65) Prior Publication Data

US 2020/0377681 A1 Dec. 3, 2020

Related U.S. Application Data

(63) Continuation of application No. PCT/JP2019/007509, filed on Feb. 27, 2019.

(30) Foreign Application Priority Data

Feb. 27, 2018 (JP) .................................. 2018-032768

(51) Int. Cl.
*C08J 5/24* (2006.01)
*C08J 5/04* (2006.01)
*C08G 73/10* (2006.01)
*C08L 71/00* (2006.01)

(52) U.S. Cl.
CPC ....... *C08G 73/1071* (2013.01); *C08G 73/105* (2013.01); *C08J 5/042* (2013.01); *C08J 5/243* (2021.05); *C08L 71/00* (2013.01); *C08G 2650/40* (2013.01)

(58) Field of Classification Search
CPC ......... C08J 5/24; C08J 5/042; C08G 73/1071; C08G 73/105; C08G 2650/40; C08L 71/00
See application file for complete search history.

(56) References Cited

U.S. PATENT DOCUMENTS

| | | | |
|---|---|---|---|
| 2003/0186068 A1 | 10/2003 | Taniguchi et al. | |
| 2011/0104417 A1* | 5/2011 | Wang ..................... | C08L 79/08 521/134 |
| 2012/0107551 A1 | 5/2012 | Fang et al. | |

FOREIGN PATENT DOCUMENTS

| | | |
|---|---|---|
| EP | 0138129 A1 | 4/1985 |
| EP | 0254488 A2 | 1/1988 |
| EP | 1550697 A1 | 7/2005 |
| EP | 2725055 A1 | 4/2014 |
| JP | 59-187054 A | 10/1984 |
| JP | 61-500023 A | 1/1986 |
| JP | 63-080411 A | 4/1988 |
| JP | 06-42302 A | 2/1994 |
| JP | 2002-226699 A | 8/2002 |
| JP | 3714876 B2 | 11/2005 |
| JP | 4094211 B2 | 6/2008 |
| JP | 4201965 B2 | 12/2008 |
| JP | 2010052366 A * | 3/2010 |
| JP | 2012-092337 A | 5/2012 |
| JP | 2012-246442 A | 12/2012 |
| WO | 85/01509 A1 | 4/1985 |
| WO | 2008/096312 A1 | 8/2008 |
| WO | 2015/059216 A1 | 4/2015 |
| WO | 2017/165805 A1 | 9/2017 |

OTHER PUBLICATIONS

English translation of JP 2010-052366 A to Matsui et al. obtained from PE2E database (Year: 2010).*
International Search Report issued in corresponding International Patent Application No. PCT/JP2019/007509, dated Jun. 4, 2019.
Extended European Search Report (EESR) issued in corresponding European Patent Application No. 19760569.4, dated Mar. 24, 2021.

* cited by examiner

*Primary Examiner* — Jeremy R Pierce
(74) *Attorney, Agent, or Firm* — Morgan, Lewis & Bockius LLP

(57) ABSTRACT

Provided is a fiber-reinforced thermoplastic resin prepreg which exhibits high interfacial adhesion between reinforcement fibers and a matrix resin, while having excellent interlaminar fracture resistance. The fiber-reinforced thermoplastic resin prepreg of the present invention comprises: a matrix resin comprising a polyarylketone resin and a polyetherimide resin; and a carbon fiber, wherein the polyetherimide resin in the matrix resin comprises a polyetherimide resin having a structural unit represented by Formula (1), an amount of the polyetherimide resin in the matrix resin (100% by mass) is 3% by mass to 25% by mass, and an amount of the polyarylketone resin in the matrix resin (100% by mass) is 75% by mass or more.

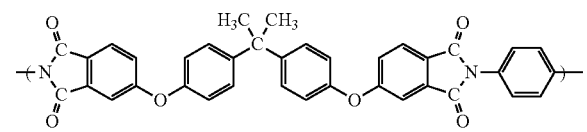

(1)

19 Claims, No Drawings

FIBER-REINFORCED THERMOPLASTIC RESIN PREPREG AND SHAPED ARTICLE

This application is a continuation application of International Application No. PCT/JP2019/007509, filed on Feb. 27, 2019, which claims the benefit of priority of the prior Japanese Patent Application No. 2018-032768, filed on Feb. 27, 2018, the contents of which are incorporated herein by reference.

TECHNICAL FIELD

The present invention relates to a fiber-reinforced thermoplastic resin prepreg and a shaped article.

BACKGROUND ART

A polyarylketone resin represented by a polyetheretherketone resin is excellent in heat resistance, flame retardant property, hydrolysis resistance, chemical resistance, and the like, and therefore, widely used mainly for aircraft parts, electric or electronic parts. However, raw materials for the polyarylketone resin are very expensive. Furthermore, a glass transition temperature of the resin is relatively low as about 140° C. to 170° C., so that various attempts have been carried out to improve the heat resistance. Most of all, as a resin-based exhibiting excellent compatibility, a blend with a polyetherimide resin has attracted attention.

Patent Documents 1 and 2 disclose a mixed composition of a polyarylketone resin and a polyetherimide resin, but mainly discuss the effect of chemical resistance.

It is reported in Patent Document 3 that wear resistance is improved by a combination of a blend resin of a polyarylketone resin and a polyetherimide resin, a fibrous filler, and a non-fibrous filler.

It is reported in Patent Document 4 that a carbon fiber composite material including continuous fibers made of a polyarylketone resin and a polyetherimide resin. However, it is also reported that mechanical properties decrease although the heat resistance is improved in a case in which a content proportion of polyetherimide resin in a matrix resin is 30% by mass or more.

The present inventors have also proposed formulations of heat resistant resins, and films and laminated plates thereof in Patent Documents 5 to 7, but the content proportion of polyetherimide in the matrix resin was 30% by mass or more.

CITATION LIST

Patent Document

[Patent Document 1]
  Japanese Unexamined Patent Application First Publication No. S59-187054
[Patent Document 2]
  Published Japanese Translation No. S61-500023 of the PCT International Publication for Patent Applications
[Patent Document 3]
  PCT international Publication No. WO 2015/059216
[Patent Document 4]
  Japanese Unexamined Patent Application First Publication No. S63-80411
[Patent Document 5]
  Japanese Patent (Granted) Publication No. 3714876
[Patent Document 6]
  Japanese Patent (Granted) Publication No. 4094211
[Patent Document 7]
  Japanese Patent (Granted) Publication No. 4201965

SUMMARY OF INVENTION

Technical Problem

An inorganic filler in these Patent Documents is a short reinforcement fiber having a length of several mm or less used as an injection molding article, and an interfacial adhesion between reinforcement fibers having a fiber length of several mm or more which are used for prepreg and a matrix resin was not discussed in Patent Documents. In addition, a content proportion of the polyetherimide resin in the matrix resin was 30% by mass or more. In a case of the composite material including the continuous fibers, the content proportion of the polyetherimide resin in the matrix resin is 30% by mass or more, whereby the heat resistance is improved. However, it is only reported that mechanical properties are impaired.

The interfacial adhesion between the reinforcement fibers and the polyarylketone resin was not sufficient as compared with a thermosetting resin such as an epoxy resin. Furthermore, in order to suppress an interlaminar fracture of a fiber-reinforced thermoplastic resin shaped article, which is caused by impacts or repeated loads, a higher interfacial adhesion than an interfacial adhesion between reinforcement fibers in the related art and a polyarylketone resin was required.

Solution to Problem

The present inventors have conducted intensive studies to solve the above problems, and as a result, the present inventors have found that the problems can be solved by mixing a polyarylketone resin with a polyetherimide resin at a specific content proportion, and have completed the present invention.

That is, the gist of the present invention is described as follows.

[1] A fiber-reinforced thermoplastic resin prepreg comprising:
  a matrix resin comprising a polyarylketone resin and a polyetherimide resin; and
  a carbon fiber,
  wherein the polyetherimide resin in the matrix resin comprises a polyetherimide resin having a structural unit represented by Formula (1),
  an amount of the polyetherimide resin in the matrix resin (100% by mass) is 3% by mass to 25% by mass, and
  an amount of the polyarylketone resin in the matrix resin (100% by mass) is 75% by mass or more.

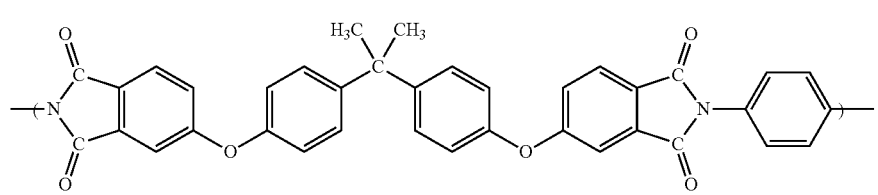

[2] The fiber-reinforced thermoplastic resin prepreg according to [1],
wherein an amount of the polyetherimide resin in the matrix resin (100% by mass) is 3% by mass to 15% by mass, and
an amount of the polyarylketone resin in the matrix resin (100% by mass) is 85% by mass or more.

[3] The fiber-reinforced thermoplastic resin prepreg according to [1] or [2], wherein the carbon fiber is a continuous carbon fiber.

[4] The fiber-reinforced thermoplastic resin prepreg according to any one of [1] to [3], wherein a melt volume rate (MVR; preset temperature: 360° C., load: 5 kg) of the polyetherimide resin having the structural unit represented by Formula (1), which is measured according to ISO 1133, is 15 cm$^3$/10 minutes to 30 cm$^3$/10 minutes.

[5] The fiber-reinforced thermoplastic resin prepreg according to any one of [1] to [3], wherein a melt volume rate (MVR; preset temperature: 360° C. load: 5 kg) of the polyetherimide resin having the structural unit represented by Formula (1), which is measured according to ISO 1133, is 1 cm$^3$/10 minutes to 10 cm$^3$/10 minutes.

[6] The fiber-reinforced thermoplastic resin prepreg according to any one of [1] to [5], further comprising a polyetherimide resin having a structural unit different from a structural unit represented by Formula (1), as the polyetherimide resin in the matrix resin.

[7] The fiber-reinforced thermoplastic resin prepreg according to [6], wherein the structural unit different from the structural unit represented by Formula (1) is a structural unit represented by Formula (3).

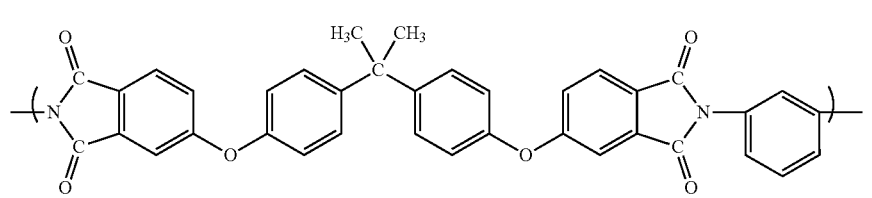

[8] The fiber-reinforced thermoplastic resin prepreg according to any one of [1] to [7], comprising a polyetheretherketone resin having a structural unit represented by Formula (2), as the polyarylketone resin in the matrix resin.

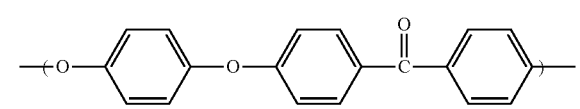

[9] The fiber-reinforced thermoplastic resin prepreg according to any one of [1] to [8], wherein a melt volume rate (MVR; preset temperature: 380° C., load: 5 kg) of the polyarylketone resin in the matrix resin, which is measured according to ISO 1133, is 1 cm$^3$/10 minutes to 80 cm$^3$/10 minutes.

[10] The fiber-reinforced thermoplastic resin prepreg according to any one of [1] to [9], comprising two or more polyetheretherketone resins having viscosities different from one another, as the polyarylketone resin in the matrix resin.

[11] The fiber-reinforced thermoplastic resin prepreg according to any one of [1] to [10], comprising, as the polyarylketone resin in the matrix resin:
a polyetheretherketone resin having a melt volume rate (MVR; preset temperature: 380° C. load: 5 kg) of 1 cm$^3$/10 minutes to 80 cm³/10 minutes, which is measured according to ISO 1133, and having a structural unit represented by Formula (2); and a polyetheretherketone resin having a melt volume rate (MVR; preset temperature: 380° C., load: 5 kg) of 100 cm³/10 minutes to 200 cm³/10 minutes, which is measured according to ISO 1133, and having a structural unit represented by Formula (2).

[12] A shaped article obtained by shaping the fiber-reinforced thermoplastic resin prepreg according to any one of [1] to [11].

[13] A fiber-reinforced thermoplastic resin prepreg comprising:

a matrix resin including a polyarylketone resin and a polyetherimide resin; and a carbon fiber, wherein an amount of the polyetherimide resin in the matrix resin (100% by mass) is 25% by mass or less.

Effects of Invention

The fiber-reinforced thermoplastic resin prepreg of the present invention exhibits high interfacial adhesion between reinforcement fibers and a matrix resin, while having excellent impact-resistant characteristics, specifically excellent interlaminar fracture resistance.

DESCRIPTION OF EMBODIMENTS (Fiber-Reinforced Thermoplastic Resin Prepreg)

A fiber-reinforced thermoplastic resin prepreg of the present invention includes a matrix resin and carbon fibers, and the matrix resin includes a polyarylketone resin and a polyetherimide resin.

(Carbon Fiber)

As a shape of a carbon fiber included in the fiber-reinforced thermoplastic resin prepreg of the present invention, a shape of fibers formed by aligning fibers in one direction and a shape of fibers such as a plain weave, a twill weave, and a satin weave are suitable. The shape of fibers formed by unidirectionally aligned fibers is particularly preferred.

Furthermore, from the viewpoint of residual stress after shaping, a thickness of the fiber-reinforced thermoplastic resin prepreg is preferably 0.04 to 0.7 mm, more preferably from 0.07 to 0.4 mm.

A volume content (Vr) of the carbon fibers in the fiber-reinforced thermoplastic resin prepreg of the present invention is preferably 20% to 70%, and more preferably 40% to 60% from the viewpoint of high elastic modulus or strength.

The fiber-reinforced thermoplastic resin prepreg of the present invention may include reinforcement fibers other than the carbon fibers.

As the reinforcement fibers, inorganic fibers, metal fibers, or fibers formed by mixing the inorganic fibers with the metal fibers can be used. Examples of the inorganic fibers include carbon fibers, graphite fibers, silicon carbide fibers, alumina fibers, tungsten carbide fibers, boron fibers, and glass fibers. As the metal fibers, fibers made of stainless steel, iron, or the like can be used, and carbon fibers coated with metal can also be used.

Examples of the carbon fibers included in the fiber-reinforced thermoplastic resin prepreg of the present invention include polyacrylonitrile (PAN)-based, petroleum and coal pitch-based, rayon-based, lignin-based carbon fibers, and the like, and any carbon fiber can be used. Particularly, a strand or a tow of PAN-based carbon fibers using PAN as a raw material, which is consisting of 12,000 to 48,000 filaments, is excellent in productivity and mechanical properties on an industrial scale, and is preferred.

Particularly, continuous carbon fibers are preferable as the carbon fibers included in the fiber-reinforced thermoplastic resin prepreg of the present invention.

In the present specification, the continuous carbon fibers include a shape of carbon fibers aligned unidirectionally and a woven shape (for example, a plain weave, a twill weave, a satin weave).

(Matrix Resin)

The fiber-reinforced thermoplastic resin prepreg of the present invention includes a matrix resin including a polyarylketone resin and a polyetherimide resin.

A volume content (Vr) of the matrix resin in the fiber-reinforced thermoplastic resin prepreg of the present invention is preferably 30% to 80%, and more preferably 40% to 60% from the viewpoint of high elastic modulus or strength.

In the matrix resin included in the fiber-reinforced thermoplastic resin prepreg of the present invention, a mixing proportion of the polyarylketone resin to the polyetherimide resin is 97:3 to 75:25 at a resin mass ratio of the polyarylketone resin:polyetherimide, more preferably 90:10 to 8020, and even more preferably 97:3 to 85:15.

In a case in which the mixing proportion of the polyarylketone resin in the matrix resin is the lower limit or more, the solvent resistance hardly decreases, and in a case in which the mixing proportion of the polyarylketone resin is the upper limit or leas, sufficient adhesion with the carbon fibers is easily achieved.

(Polyarylketone Resin)

The polyarylketone resin included in the matrix resin of the fiber-reinforced thermoplastic resin prepreg of the present invention is a thermoplastic resin having an aromatic nucleus bond, an ether bond, and a ketone bond in a structural unit thereof, and typical examples thereof include polyetherketone, polyetheretherketone, polyetherketoneketone, and the like. In the fiber-reinforced thermoplastic resin prepreg of the present invention, polyetheretherketone having the structural unit represented by Formula (2) is suitability used.

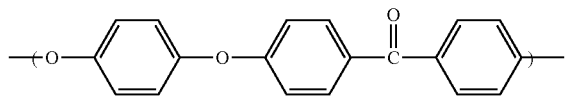

(2)

As the above polyetheretherketone, commercially available products can be used, and examples thereof can include "VESTAKEEP (registered trademark) (trade name, produced by Daicel Evonik Ltd.; the same applies hereinafter), 3300G", "VESTAKEEP-J ZV7402", "VESTAKEEP 1000G", and the like.

A proportion of the structural unit represented by Formula (2) in polyetheretherketone (100% by mass) having the structural unit represented by Formula (2) is preferably 70% by mass to 100% by mass, more preferably 80% by mass to 100% by mass, and particularly preferably 90% by mass to 100% by mass.

A content proportion of the polyarylketone resin in the matrix resin (100% by mass) included in the fiber-reinforced thermoplastic resin prepreg of the present invention is preferably 75% by mass or more, and more preferably 85% by mass or more.

From the viewpoint of heat resistance, the polyarylketone resin included in the matrix resin of the fiber-reinforced thermoplastic resin prepreg of the present invention preferably has a crystal melting peak temperature of 260° C. or higher.

The crystal melting peak temperature can be measured by a differential scanning calorimeter (DSC).

The polyarylketone resin included in the matrix resin of the fiber-reinforced thermoplastic resin prepreg of the present invention may include a polyarylketone resin other than the polyetheretherketone having the structural unit represented by Formula (2).

An example of such a polyarylketone resin includes a polyetherketoneketone resin.

For example, "Kepstan (registered trademark) 7002" produced by Arkema S. A. and the like can be used.

The polyarylketone resin included in the matrix resin of the fiber-reinforced thermoplastic resin prepreg of the present invention may be used alone, or two or more polyarylketone resins may be used in combination.

The polyarylketone resin included in the matrix resin of the fiber-reinforced thermoplastic resin prepreg of the present invention preferably includes two or more polyetheretherketone resins having viscosities different from one another.

In a case in which the polyarylketone resin included in the matrix resin of the fiber-reinforced thermoplastic resin prepreg of the present invention includes two or more polyetheretherketone resins having viscosities different from one another, a content proportion of two polyetheretherketone resins having viscosities different from each other at a mass ratio (a resin of high viscosity:a resin of low viscosity) is preferably 90:10 to 10:90, and more preferably 70:30 to 20:80. Particularly, the polyarylketone resin included in the matrix resin of the fiber-reinforced thermoplastic resin prepreg of the present invention preferably includes two or more polyetheretherketone resins having viscosities different from one another and having the structural unit represented by Formula (2).

As a viscosity of the polyarylketone resin, in one aspect, a melt volume rate (MVR; preset temperature: 380° C., load: 5 kg) measured according to ISO 1133 is preferably 1 to 80 cm$^3$/10 minutes, and in another aspect, a melt volume rate (MVR; preset temperature: 380° C. load: 5 kg) measured according to ISO 1133 is preferably 100 to 200 cm$^3$/10 minutes.

Also, a polyetheretherketone resin having a melt volume rate (MVR; preset temperature: 380° C., load: 5 kg) of 1 to 80 cm$^3$/10 minutes, which is measured according to ISO 1133, and a polyetheretherketone resin having a melt volume rate (MVR; preset temperature: 380° C., load: 5 kg) of 100 to 200 cm$^3$/10 minutes, which is measured according to ISO 1133 are preferably used in combination, and a polyetheretherketone resin having a melt volume rate (MVR; preset temperature: 380° C., load: 5 kg) of 1 to 80 cm$^3$/10 minutes, which is measured according to ISO 1133, and having the structural unit represented by Formula (2), and a polyetheretherketone resin having a melt volume rate (MVR; preset temperature: 380° C., load: 5 kg) of 100 to 200 cm$^3$/10 minutes, which is measured according to ISO 1133, and having the structural unit represented by Formula (2) are preferably used in combination.

(Polyetherimide Resin)

The polyetherimide resin included in the matrix resin of the fiber-reinforced thermoplastic resin prepreg of the present invention is not particularly limited, and commercially available polyetherimide resins such as a polyetherimide resin having the structural unit represented by Formula (3) (for example, "Ultem (registered trademark) (trade name, produced by SABIC; the same applies hereinafter) 1000" and "Ultem 1010"), and a polyetherimide resin having the structural unit represented by Formula (1) (for example, "Ultem CRS5011" and "Ultem CRS5001" (trade name, produced by SABIC)) are can be used. In one aspect, from the viewpoint of high heat resistance, it is preferable to use a polyetherimide resin having the structural unit represented by Formula (3), and in another aspect, from the viewpoint of high crystallinity, it is preferable to use a polyetherimide resin having the structural unit represented by Formula (1). From the viewpoint of strength in a direction perpendicular to fibers, a content proportion of the polyetherimide resin in the matrix resin (100% by mass) included in the fiber-reinforced thermoplastic resin prepreg of the present invention is preferably 25% by mass or less. From the viewpoint of interlaminar fracture toughness, a content proportion of the polyetherimide rein having the structural unit represented by Formula (1) in the matrix resin (100% by mass) is preferably 3% to 25% by mass, and more preferably 3% to 15% by mass.

In addition, as the polyetherimide resin included in the matrix resin of the fiber-reinforced thermoplastic resin prepreg of the present invention, the polyetherimide resin having the structural unit represented by Formula (1) and a polyetherimide resin having a structural unit different from the structural unit represented by Formula (1) are preferably used in combination.

As the polyetherimide resin having a structural unit different from the structural unit represented by Formula (1), a polyetherimide resin having the structural unit represented by Formula (3) is preferable.

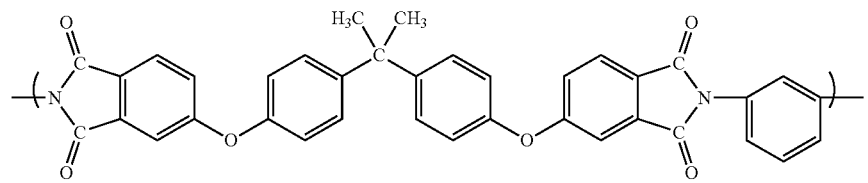

(3)

-continued

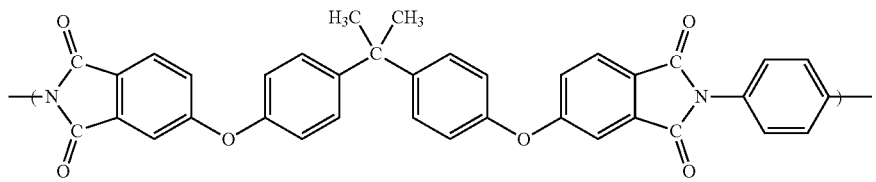

(1)

A proportion of the structural unit represented by Formula (1) in the polyetherimide resin (100% by mass) having the structural unit represented by Formula (1) is preferably 50% by mass to 100% by mass, more preferably 70% by mass to 100% by mass, and particularly preferably 95% by mass to 100% by mass.

A proportion of the structural unit represented by Formula (3) in the polyetherimide resin (100% by mass) having the structural unit represented by Formula (3) is preferably 10% by mass to 100% by mass, more preferably 30% by mass to 100% by mass, and particularly preferably 50% by mass to 100% by mass.

As the polyetherimide resin included in the matrix resin of the fiber-reinforced thermoplastic resin prepreg of the present invention, in a case in which the polyetherimide resin having the structural unit represented by Formula (1) and the polyetherimide resin having the structural unit represented by Formula (3) are used in combination, a mixing proportion of the polyetherimide resin having the structural unit represented by Formula (1) to the polyetherimide resin having the structural unit represented by Formula (3) at a resin mass ratio of the polyetherimide resin having the structural unit represented by Formula (1): the polyetherimide resin having the structural unit represented by Formula (3) is preferably 20:80 to 100:0, more preferably 40:60 to 100:0, and even more preferably 50:50 to 100:0.

As a viscosity of the polyetherimide resin, a melt volume rate (MVR; preset temperature: 360° C., load: 5 kg) measured according to ISO 1133 is preferably 1 cm$^3$/10 minutes to 30 cm$^3$/10 minutes.

As a viscosity of the polyetherimide resin having the structural unit represented by Formula (1), a melt volume rate (MVR; preset temperature: 360° C., load: 5 kg) measured according to ISO 1133 is preferably 15 cm$^3$/10 minutes to 30 cm$^3$/10 minutes from the viewpoint of producing prepreg. In addition, as a viscosity of the polyetherimide resin having the structural unit represented by Formula (1), a melt volume rate is preferably 1 cm$^3$/10 minutes to 10 cm$^3$/10 minutes from the viewpoint of mechanical properties.

As a viscosity of a m-polyetherimide resin having the structural unit represented by Formula (3), a melt volume rate (MVR; preset temperature: 360° C., load: 5 kg) measured according to ISO 1133 is preferably 10 n/10 minutes to 30 cm$^3$/10 minutes, and more preferably 20 cm$^3$/10 minutes to 30 cm$^3$/10 minutes from the viewpoint of producing prepreg.

(Other Additives)

The matrix resin of the fiber-reinforced thermoplastic resin prepreg of the present invention may include resins other than a polyarylketone resin and a polyetherimide resin, and include various additives other than carbon fibers to the extent that properties thereof are not impaired.

Examples of the various additives other than the carbon fibers can include a heat stabilizer, an ultraviolet absorber, a light stabilizer, a nucleating agent, a coloring agent, a lubricant, a flame retardant, and the like, and the various additives can be mixed in the matrix resin using a known method.

(Method of Producing Fiber-Reinforced Thermoplastic Resin Prepreg)

The fiber-reinforced thermoplastic resin prepreg of the present invention can be produced by a method of processing a matrix resin including a polyarylketone resin and a polyetherimide resin to be a film shape having a thickness of 10 to 100 μm, a fiber shape having a fiber diameter of 5 to 50 μm, or a powder shape having a particle diameter of 10 to 100 μm, attaching the processed matrix resin to reinforcement fibers, and then heating and melting the matrix resin while removing air between the reinforcement fibers, or by other known methods.

Viscosities of the polyarylketone resin and the polyetherimide resin included in the matrix resin of the fiber-reinforced thermoplastic resin prepreg of the present invention can be appropriately selected depending on processed shapes of resins, methods of producing prepreg, or required physical properties.

In a case in which generally an average molecular weight of a thermoplastic resin is low and a viscosity is relatively low, specifically a polyetheretherketone (PEEK) resin, prepreg can be easily produced as long as a resin whose melt volume rate (MVR; preset temperature: 380° C., load: 5 kg) measured according to ISO 1133 is 10 cm$^3$/10 minutes or higher.

On the other hand, in a case in which an average molecular weight is high and a viscosity is relatively high, specifically a PEEK resin, properties of a fiber-reinforced thermoplastic resin shaped article is excellent as long as a resin whose MVR (preset temperature: 380° C., load: 5 kg) measured according to ISO 1133 is 150 cm$^3$/10 minutes or lower.

The fiber-reinforced thermoplastic resin prepreg obtained according to the present invention can be used as a material laminated at various angles depending on application in order to produce various fiber-reinforced thermoplastic resin shaped articles, and examples thereof include a unidirectional material, an cross-ply lamination material, and a quasi-isotropic lamination material. In addition, in order to improve moldability, fiber-reinforced thermoplastic resin prepregs are subjected to slit processing to produce slit prepregs, or subjected to cut into rectangular or parallelogram chopped strands to produce a randomly oriented sheet by distributed chopped strands isotropically or anisotropically.

(Shaped Article)

A shaped article of the present invention is a shaped article obtained by shaping the fiber-reinforced thermoplastic resin prepreg of the present invention. Therefore, the shaped article of the present invention includes a matrix resin and carbon fibers, and the matrix resin includes a polyarylketone resin and a polyetherimide resin.

(Method of Shaping Fiber-Reinforced Thermoplastic Resin Prepreg)

A method of shaping fiber-reinforced thermoplastic resin prepreg of the present invention to obtain a shaped article of the present invention is not particularly limited, and the shaped article can be obtained by laminating one or more fiber-reinforced thermoplastic resin prepregs of the present invention and using known shaping methods such as a matched-die pressing method, an autoclave method, a hot or cold pressing method, an automated laying method using a robot, and the like.

EXAMPLES

Hereinafter, the present invention will be described in detail with reference to Examples, but the present invention is not limited thereto.

Example 1

(Preparation of Prepreg)

A PEEK resin 1 (produced by Daicel Evonik Ltd., trade name "VESTAKEEP (registered trademark) 3300G"), MVR: 20 cm/10 minutes; preset temperature: 380° C., load: 5 kg) which is a polyarylketone resin having a structural unit represented by Formula (2) and a p-PEI resin 1 (produced by SABIC, trade name "Ultem (registered trademark) CRS5011", MVR: 20 cm/10 minutes; preset temperature: 360° C. load: 5 kg) which is a polyetherimide resin having a structural unit represented by Formula (1) were mixed with each other to have a mass ratio of 90:10, and a film having a thickness of 25 µm was obtained using an extruder equipped with a T-die.

Carbon fibers (produced by Mitsubishi Chemical Corporation, trade name "MR50R", 570 tex, 12,000 strands) were used to obtain a carbon fiber sheet in which continuous carbon fibers are aligned unidirectionally and which has a carbon fiber areal weight of 190 g/m², and the film prepared above was laminated on both sides of the carbon fiber sheet and then heated, melted, and impregnated into the carbon fiber sheet to prepare a fiber-reinforced thermoplastic resin prepreg. A thickness of the obtained fiber-reinforced thermoplastic resin prepreg was 0.18 to 0.19 nm. A fiber volume fraction was 58%.

(Preparation of Molded Plate)

The obtained fiber-reinforced thermoplastic resin prepreg was cut into a predetermined size, and then a laminate corresponding with each test was placed in a steel mold. The mold containing the laminate was compressed by a double-platen hot and cold press (manufactured by Shinto Metal Industries, Ltd., 50 ton press) under molding conditions of 380° C. and 5 MPa for 30 minutes, and then cooled down to 200° C. in a few minutes. Therefore, a fiber-reinforced thermoplastic resin molded plate having extremely few voids and defects was obtained.

(90° Flexural Test)

The fiber-reinforced thermoplastic resin prepregs were laminated to obtain a molded plate which has a thickness of about 2 mm and in which fibers were aligned unidirectionally. A transverse directional (90°) flexural test was performed using a test method according to ASTM D790, and a 90° flexural strength (FS90) was measured.

(Interlaminar Fracture Toughness Test)

The fiber-reinforced thermoplastic resin prepregs were laminated to obtain a molded plate which has a thickness of about 3 mm and in which fibers were aligned unidirectionally and a polyimide film having a thickness of about 10 µm was partially inserted at a thickness center. Mode 1 interlaminar fracture toughness ($G_{IC}$) was measured by a test method according to ASTM D5528. Mode II interlaminar fracture toughness ($G_{IIC}$) was measured on the molded plate by a test method according to BMS8-276.

$G_{IC}$ and $G_{IIC}$ each preferably have 1.0 kJ/m² or higher as a material having excellent interlaminar fracture resistance.

(Compression after Impact Test)

The fiber-reinforced thermoplastic resin prepregs were laminated to be a quasi-isotropic laminate $[+45°/0°/-45°/90°]_{3S}$, and the obtained fiber-reinforced thermoplastic resin molded plate is subjected to a test using an impact drop machine under an impact condition of an impact energy of 6.7 J/mm according to SACMA SRM 2R. A compression after impact strength (CAI strength) was measured.

A CAI strength in a case in which the impact energy was given was preferably 300 MPa or higher.

A CAI strength of Example 1 was 300 MPa or higher.

A list of resin compositions, FS90, $G_{IC}$, and $G_{IIC}$ was shown in Table 1.

Comparative Example 11

Fiber-reinforced thermoplastic resin prepregs having a carbon fiber areal weight of 75 g/m² were obtained from a film that has a thickness of 15 µm and that is prepared from the PEEK resin 1 to produce a fiber-reinforced thermoplastic resin molded plate.

A laminating configuration in a case of CAI was $[+45°/+45°/0°/0°/-45°/-45°/90°/90°]_{4S}$, and a CAI strength was 300 MPa or higher.

Furthermore, glass transition temperature exhibiting heat resistance described in ASTM D7028 (DMA-Tg) was 145° C. There is a possibility that heat resistance is insufficient for a use at 140° C. or higher.

Example 2

The PEEK resin 1 and the p-PEI resin 1 were mixed with each other to have a mass ratio of 80:20, and fiber-reinforced thermoplastic resin prepregs were obtained in the same manner as in Comparative Example 1. Thus, a fiber-reinforced thermoplastic resin molded plate was prepared.

A CA strength was 300 MPa or higher.

Both $G_{IC}$ and $G_{IIC}$ indicated values higher than 1.0 kJ/m².

Example 3

The PEEK resin 1 and a p-PEI resin 2 (produced by SABIC, trade name "Ultem (registered trademark) CRS5001", MVR: 7 cm/10 minutes; preset temperature: 360° C., load: 5 kg) which is a polyetherimide resin having the structural unit represented by Formula (1) were mixed with each other to have a mass ratio of 80:20, and fiber-reinforced thermoplastic resin prepregs were obtained in the same manner as in Example 1. Thus, a fiber-reinforced thermoplastic resin molded plate was prepared.

A CAI strength was 300 MPa or higher.

Both $G_{IC}$ and $G_{IIC}$ were higher than 1.0 kJ/in², and FS90 and $G_{IC}$ indicated higher values than Comparative Example 1.

Example 4

The PEEK resin 1, the p-PEI resin 1, and a m-PEI resin 1 (produced by SABIC, trade name "Ultem (registered trademark) 1010", MVR: 25 cm³/10 minutes; preset temperature: 360° C., load: 5 kg) which is a polyetherimide resin having the structural unit represented by Formula (3) were mixed with one another to have a mass ratio of 90:5:5, and fiber-reinforced thermoplastic resin prepregs were obtained in the same manner as in Example 1. Thus, a fiber-reinforced thermoplastic resin molded plate was prepared.

A CAI strength was 300 MPa or higher.

$G_{IC}$, $G_{IIC}$, and FS90 indicated values higher than Comparative Example 1.

Comparative Example 2

The PEEK resin 1 and the p-PEI resin 1 were mixed with each other to have a mass ratio of 60:40, and fiber-reinforced thermoplastic resin prepregs were obtained in the same manner as in Comparative Example 1. Thus, a fiber-reinforced thermoplastic resin molded plate was prepared.

A CAI strength was 300 MPa or higher.

$G_{IC}$, $G_{IIC}$, and FS90 all indicated lower values than Comparative Example 1.

Comparative Example 3

The PEEK resin 1, the p-PEI resin 1, and the m-PEI resin 1 were mixed with one another to have a mass ratio of 60:20:20, and fiber-reinforced thermoplastic resin prepregs were obtained in the same manner as in Comparative Example 1. Thus, a fiber-reinforced thermoplastic resin molded plate was prepared.

A CAI strength was 300 MPa or higher.

In addition. FS90 was low, and $G_{IC}$ indicated a value lower than 1.0 kJ/m$^2$.

Reference Example 1

The PEEK resin 1 and the m-PEI resin 1 were mixed with each other to have a mass ratio of 90:10, and fiber-reinforced thermoplastic resin prepregs were obtained in the same manner as in Example 1. Thus, a fiber-reinforced thermoplastic resin molded plate was prepared.

A CAI strength was 300 MPa or higher, but both $G_{IC}$ and $G_{IIC}$ indicated values lower than 1.0 kJ/m$^2$.

Reference Example 2

The PEEK resin 1 and the m-PEI resin 1 were mixed with each other to have a mass ratio of 80:20, and fiber-reinforced thermoplastic resin prepregs were obtained in the same manner as in Example 1. Thus, a fiber-reinforced thermoplastic resin molded plate was prepared.

A CAI strength was 300 MPa or higher, but $G_{IC}$ indicated a value lower than 1.0 kJ/m$^2$.

Comparative Example 4

A PEEK resin 2 (produced by Daicel Evonik Ltd., trade name "VESTAKEEP (registered trademark) J ZV7402", MVR: 65 cm$^2$/10 minutes; preset temperature: 380° C., load: 5 kg) which is a polyarylketone resin having the structural unit represented by Formula (2) and a PEEK resin 3 (produced by Daicel Evonik Ltd., trade name "VESTAKEEP (registered trademark) 1000G", MVR: 150 cm/10 minutes; preset temperature: 380° C., load: 5 kg) were mixed with each other to have a mass ratio of 60:40, and fiber-reinforced thermoplastic resin prepregs were obtained in the same manner as in Comparative Example 1. Thus, a fiber-reinforced thermoplastic resin molded plate was produced, and the above characteristics were acquired.

Example 5

The PEEK resin 2, the PEEK resin 3, and the p-PEI resin 1 were mixed with one another to have a mass ratio of 48:32:20 (a mass ratio of the PEEK resin 2 to the PEEK resin 3 was 60:40), and fiber-reinforced thermoplastic resin prepregs were obtained in the same manner as in Comparative Example 6. Thus a fiber-reinforced thermoplastic resin molded plate was prepared.

FS90 indicated a higher value than Comparative Example 6 which did not include the p-PEI resin 1.

Example 6

The PEEK resin 2, the PEEK resin 3, the p-PEI resin 1, and the m-PEI resin 1 were mixed with one another to have a mass ratio of 54:36:5:5 (a mass ratio of the PEEK resin 2 to the PEEK resin 3 was 60:40), and fiber-reinforced thermoplastic resin prepregs were obtained in the same manner as in Comparative Example 6. Thus a fiber-reinforced thermoplastic resin molded plate was prepared.

FS90 indicated a higher value than Comparative Example 6 which did not include the p-PEI resin 1 and the m-PEI resin 1.

TABLE 1

| | | Example | | | | Comparative Example | | | Reference Example | | Example | | Comparative Example |
|---|---|---|---|---|---|---|---|---|---|---|---|---|---|
| | | 1 | 2 | 3 | 4 | 1 | 2 | 3 | 1 | 2 | 5 | 6 | 4 |
| Carbon fiber | Sort | MR50R | MR50R | MR50R | MR50R | MR50R | MR50R | MR50R | MR50R | MR50R | MR50R | MR50R | MR50R |
| | Fiber areal weight (g/m$^2$) | 190 | 75 | 190 | 190 | 75 | 75 | 75 | 190 | 190 | 75 | 75 | 75 |
| Polyarylketone resin | PEEK resin 1 | 90 | 80 | 80 | 90 | 100 | 60 | 60 | 90 | 80 | | | |
| | PEEK resin 2 | | | | | | | | | | 54 | 48 | 60 |
| | PEEK resin 3 | | | | | | | | | | 36 | 32 | 40 |
| Polyetherimide resin | p-PEI resin 1 | 10 | 20 | | 5 | | 40 | 20 | | | 5 | 20 | |
| | p-PEI resin 2 | | | 20 | | | | | | | | | |
| | m-PEI resin 1 | | | | 5 | | | 20 | 10 | 20 | 5 | | |
| FS90 (MPa) | | 138 | 107 | 143 | 152 | 133 | 105 | 99 | 150 | 136 | 120 | 133 | 70 |
| $G_{IC}$ (kJ/m$^2$) | | 1.6 | 1.2 | 1.8 | 2.0 | 1.7 | 1.3 | 0.8 | 0.7 | 0.8 | 1.2 | 1.1 | 1.3 |
| $G_{IIC}$ (kJ/m$^2$) | | 1.7 | 1.5 | 1.4 | 2.1 | 1.5 | 1.1 | 1.5 | 0.8 | 1.3 | 1.5 | 1.3 | 1.7 |

According to Table 1, the matrix resin obtained by blending the polyetherimide resin with the polyarylketone resin had an improved strength in a transverse direction to fibers (concretely, FS90) where the fiber-reinforced thermoplastic resin shaped plate has a lower strength, and an improved interlaminar fracture toughness (concretely, $G_{IC}$ and $G_{IIC}$). This means that interface strength was improved by adding the polyetherimide resin. It is an important factor to avoid interlaminar fracture between fiber-reinforced thermoplastic resin prepregs in a fiber-reinforced thermoplastic resin shaped plate.

INDUSTRIAL APPLICABILITY

According to the present invention, it is possible to provide a fiber-reinforced thermoplastic resin prepreg by which a shaped article having excellent interlaminar fracture resistance due to high interface strength between reinforcement fibers and a matrix resin can be obtained.

The invention claimed is:

1. A fiber-reinforced thermoplastic resin prepreg comprising:
a matrix resin comprising a polyarylketone resin and a polyetherimide resin; and
a continuous carbon fiber,
wherein the polyetherimide resin in the matrix resin comprises a polyetherimide resin having a structural unit represented by Formula (1),
an amount of the polyetherimide resin in the matrix resin (100% by mass) is 3% by mass to 25% by mass, and
an amount of the polyarylketone resin in the matrix resin (100% by mass) is 75% by mass or more.

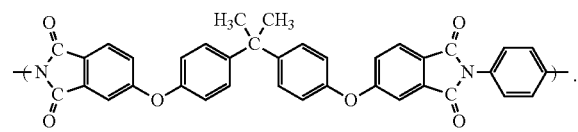
(1)

2. The fiber-reinforced thermoplastic resin prepreg according to claim 1,
wherein an amount of the polyetherimide resin in the matrix resin (100% by mass) is 3% by mass to 15% by mass, and
an amount of the polyarylketone resin in the matrix resin (100% by mass) is 85% by mass or more.

3. The fiber-reinforced thermoplastic resin prepreg according to claim 1, wherein a melt volume rate (MVR; preset temperature: 360° C., load: 5 kg) measured according to ISO 1133 of the polyetherimide resin having a structural unit represented by Formula (1) is 15 cm³/10 minutes to 30 cm³/10 minutes.

4. The fiber-reinforced thermoplastic resin prepreg according to claim 1, wherein a melt volume rate (MVR; preset temperature: 360° C., load: 5 kg) measured according to ISO 1133 of the polyetherimide resin having the structural unit represented by Formula (1) is 1 cm³/10 minutes to 10 cm³/10 minutes.

5. The fiber-reinforced thermoplastic resin prepreg according to claim 1, further comprising a polyetherimide resin having a structural unit different from the structural unit represented by Formula (1), as the polyetherimide resin in the matrix resin.

6. The fiber-reinforced thermoplastic resin prepreg according to claim 5, wherein the structural unit different from the structural unit represented by Formula (1) is a structural unit represented by Formula (3).

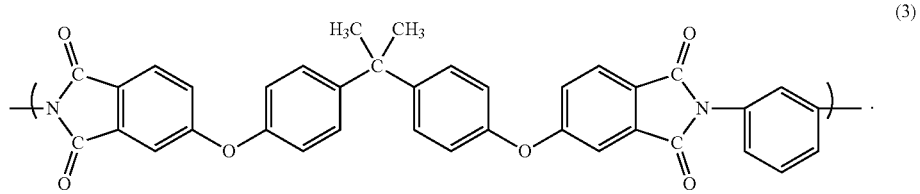
(3)

7. The fiber-reinforced thermoplastic resin prepreg according to claim 1, comprising a polyetheretherketone resin having a structural unit represented by Formula (2), as the polyarylketone resin in the matrix resin.

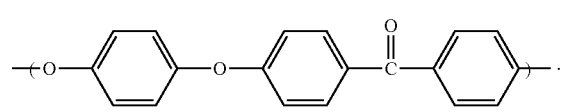
(2)

8. The fiber-reinforced thermoplastic resin prepreg according to claim 1, wherein a melt volume rate (MVR; preset temperature: 380° C., load: 5 kg) measured according to ISO 1133 of the polyarylketone resin in the matrix resin is 1 cm³/10 minutes to 80 cm³/10 minutes.

9. The fiber-reinforced thermoplastic resin prepreg according to claim 1, comprising two or more polyetheretherketone resins having viscosities different from one another, as the polyarylketone resin in the matrix resin.

10. The fiber-reinforced thermoplastic resin prepreg according to claim 1, comprising, as the polyarylketone resin in the matrix resin:
a polyetheretherketone resin having a melt volume rate (MVR; preset temperature: 380° C., load: 5 kg) measured according to ISO 1133 of 1 cm³/10 minutes to 80 cm³/10 minutes, and having a structural unit represented by Formula (2); and
a polyetheretherketone resin having a melt volume rate (MVR; preset temperature: 380° C., load: 5 kg) measured according to ISO 1133 of 100 cm³/10 minutes to 200 cm³/10 minutes, and having a structural unit represented by Formula (2).

11. A shaped article obtained by shaping the fiber-reinforced thermoplastic resin prepreg according to claim 1.

12. The fiber-reinforced thermoplastic resin prepreg according to claim 1, wherein a thickness of the fiber-reinforced thermoplastic resin prepreg is 0.04 to 0.4 mm.

13. The fiber-reinforced thermoplastic resin prepreg according to claim 1, wherein a thickness of the fiber-reinforced thermoplastic resin prepreg is 0.07 to 0.4 mm.

14. The fiber-reinforced thermoplastic resin prepreg according to claim 1, wherein a volume content of the matrix resin in the fiber-reinforced thermoplastic resin prepreg is 30 to 80%.

15. The fiber-reinforced thermoplastic resin prepreg according to claim 1, wherein a mixing proportion of the polyarylketone resin to the polyetherimide resin is 97:3 to 75:25.

16. The fiber-reinforced thermoplastic resin prepreg according to claim 1, wherein a mixing proportion of the polyarylketone resin to the polyetherimide resin is 90:10 to 80:20.

17. The fiber-reinforced thermoplastic resin prepreg according to claim 1, wherein the continuous carbon fiber has 12,000 to 48,000 filaments.

18. The fiber-reinforced thermoplastic resin prepreg according to claim 1, wherein fiber-reinforced thermoplastic resin prepreg has a 90° flexural strength (FS90) measured according to ASTM D790 of 107 to 152 MPa.

19. The fiber-reinforced thermoplastic resin prepreg according to claim 1, wherein fiber-reinforced thermoplastic resin prepreg has mode I interlaminar fracture toughness ($G_{IC}$) of 1.2 to 2.0 kJ/m$^2$ and/or mode II interlaminar fracture toughness ($G_{IIC}$) of 1.4 to 2.1 kJ/m$^2$.

\* \* \* \* \*